United States Patent [19]

Moloney

[11] Patent Number: 4,519,299

[45] Date of Patent: May 28, 1985

[54] RECIPROCABLE PLUNGER FUEL INJECTION PUMP

[75] Inventor: Kieron J. Moloney, Cheltenham, England

[73] Assignee: Lucas Industries Public Limited Company, Birmingham, England

[21] Appl. No.: 502,160

[22] Filed: Jun. 8, 1983

[30] Foreign Application Priority Data

Jul. 8, 1982 [GB] United Kingdom ................ 8219770

[51] Int. Cl.³ ................................................ F16J 1/10

[52] U.S. Cl. .................................. 92/129; 92/130 R; 74/569; 417/490

[58] Field of Search ............. 92/129, 130 R; 417/490; 74/569

[56] References Cited

U.S. PATENT DOCUMENTS 1,882,988 10/1932 Schulze ................................ 74/569
3,036,525 5/1962 Schulze et al. ....................... 92/129
3,190,561 6/1965 Fuller et al. ........................ 417/490
3,951,046 4/1976 Lockmann et al. ................... 92/129

FOREIGN PATENT DOCUMENTS 1328644 8/1973 United Kingdom ................. 92/129

*Primary Examiner*—Paul E. Maslousky

[57] ABSTRACT

A reciprocable plunger fuel injection pump includes a plunger reciprocable in a bore. The plunger is urged outwardly by a spring which engages a spring abutment. The abutment carries a thrust member which engages the end of the plunger and in use is engaged by an actuating member such as a cam. The thrust member is held within a recess in the abutment by a resilient member. The thickness of the thrust member can be selected during assembly of the pump to the associated engine.

4 Claims, 2 Drawing Figures

RECIPROCABLE PLUNGER FUEL INJECTION PUMP

This invention relates to a reciprocable plunger fuel injection pump comprising a body, a reciprocable plunger mounted within a bore defined in the body or a part thereof, the plunger extending from the bore, a spring abutment mounted about the outer end of the plunger, means connecting the plunger and spring abutment whereby a spring engaged with the abutment biases the plunger outwardly of the bore, and a thrust member carried by the spring abutment, said thrust member in use being engaged by an engine driven actuating member, the thrust member engaging the end of the plunger to impart inward movement thereto.

An injection pump of the kind described is intended to be mounted on the structure of the engine to which it is to supply fuel and to be actuated by an engine driven cam either directly or through some intermediate mechanism such for example as a rocker. It is important when assembling the pump on the structure of the engine to be able to take account of any manufacturing tolerances both in the construction of the pump and in the engine structure. The object of the present invention is to provide a reciprocable plunger fuel injection pump of the kind specified in a simple and convenient form.

According to the invention, in a reciprocable plunger fuel injection pump of the kind specified, said thrust member is detachably mounted on the spring abutment whereby a thrust member of the desired thickness can in use be substituted, resilient means being provided to retain the thrust member relative to the abutment.

According to a further feature of the invention said spring abutment defines an annular recess having a base wall against which the thrust member can locate, said resilient means being of annular form and being located between the side wall of the recess and said thrust member.

An example of a reciprocable plunger fuel injection pump in accordance with the invention will now be described with reference to the accompanying drawings, in which.

Figure 1:
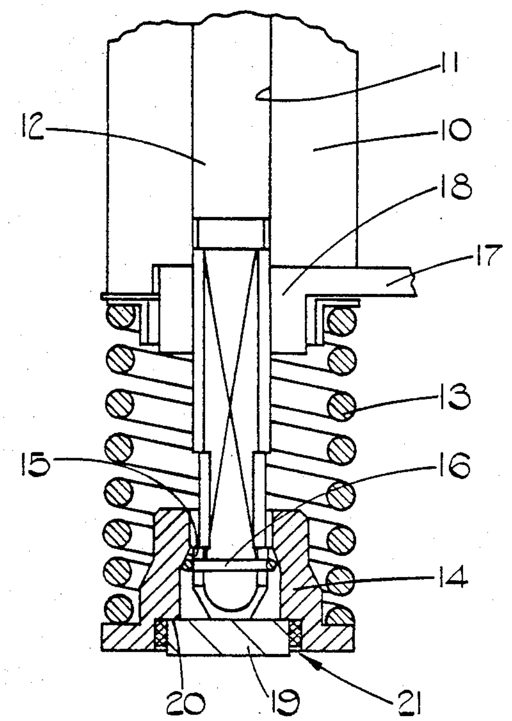
FIG. 1 is a part sectional side elevation of a portion of the pump.

Referring to the drawings, the pump comprises a pump body 10 which is adapted to be mounted on the structure of an engine to which fuel is to be supplied by the pump. The body 10 is provided with a bore 11 in which is mounted a reciprocable plunger 12 which extends from the bore. The bore and plunger define a pumping chamber having a fuel outlet which may be controlled by a conventional form of delivery valve, and also a fuel inlet whereby fuel can be admitted to the pumping chamber during the outward movement of the pumping plunger.

The outward movement of the pumping plunger is effected by means of a coiled compression spring 13 which at one end engages a flange formed on a spring abutment 14. The abutment is provided with a central aperture through which the end portion of the plunger can extend and it has a shaped outwardly extending surface 15 for engagement by a clip 16 which is located within a groove formed in the plunger. The surface 15 and the clip 16 permit slight rocking motion of the spring abutment.

The angular setting of the plunger within the bore 11 can be varied by means of a control lever 17 which is held in position against the body 10 by means of the spring 13. The plunger has a non-circular section and is located within a complementarily shaped bore formed in an annular member 18 which is integral with the lever 17.

The spring abutment mounts a thrust member 19 which in use is engaged by a cam driven by the associated engine or some other part, for example, a rocker member forming part of the engine structure. The thrust member is of disc like form and is located within an annular recess formed in the abutment, the recess defining a base wall 20 against which the thrust member is located. The thrust member engages the end of the plunger to impart inward movement to the plunger under the action of the engine driven member.

In order to take care of manufacturing tolerances in the construction of the pump and also in the construction of the engine, the thrust member 19 is detachable from the spring abutment 14 and is available in a number of thicknesses, whereby the effective length of the plunger can be varied. The thrust member is retained within the recess by resilient means 21 which is of annular form and which locates between the side wall of the recess and the side surface of the thrust member 19. The resilient means can be of any convenient form, its main purpose being to retain the thrust member in position during assembly of the pump and also during the transit of the pump.

Figure 2:
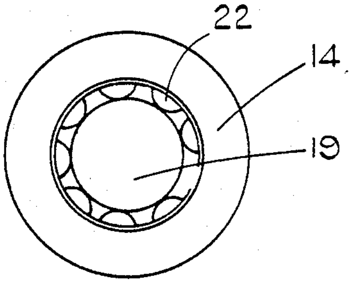
FIG. 2 is an inverted plan view of a part of the pump seen in FIG. 1.

The resilient means must be constructed from a material which can withstand the working conditions which it will experience when the pump is in use. It may for example be an "O" ring 21 as shown in FIG. 1 or it may be a so-called "star" ring, the "O" ring being formed from an elastomeric material and the "star" ring being formed from corrugated metal strip shown by reference numeral 22 in FIG. 2.

I claim:

1. A reciprocable plunger fuel injection pump comprising a body, a reciprocable plunger mounted within a bore defined in the body or a part thereof, the plunger extending from the bore, a spring abutment mounted about an outer end of the plunger, means connecting the plunger and spring abutment whereby a spring engaged with the abutment biases the plunger outwardly of the bore, a thrust member carried by the spring abutment, said thrust member in use being engaged by an engine driven actuating member, the thrust member engaging the end of the plunger to impart inward movement thereto, said thrust member being detachably mounted on the spring abutment whereby a thrust member of the desired thickness can in use be substituted, resilient means being provided to retain the thrust member relative to the abutment.

2. A pump according to claim 1 in which said spring abutment defines an annular recess having a base wall against which the thrust member can locate, said resilient means being of annular form and being located between the side wall of the recess and said thrust member.

3. A pump according to claim 2 in which said resilient means comprises an "O" ring.

4. A pump according to claim 2 in which said resilient means is formed from corrugated metal strip.

* * * * *